United States Patent [19]

Louis et al.

[11] Patent Number: 4,722,186
[45] Date of Patent: Feb. 2, 1988

[54] DUAL PRESSURE DISPLACEMENT CONTROL SYSTEM

[75] Inventors: Joseph E. Louis; Craig C. Klocke, both of Ames, Iowa

[73] Assignee: Sundstrand Corporation, Rockford, Ill.

[21] Appl. No.: 821,947

[22] Filed: Jan. 24, 1986

[51] Int. Cl.⁴ .............................................. F16D 31/02
[52] U.S. Cl. ........................................ 60/420; 60/426; 60/444; 60/452; 60/484
[58] Field of Search .................. 60/420, 426, 444, 484

[56] References Cited

U.S. PATENT DOCUMENTS

| | | | |
|---|---|---|---|
| 3,499,285 | 3/1970 | Nicholle | 60/444 X |
| 4,376,371 | 3/1983 | Kojima | 60/420 |
| 4,480,963 | 11/1984 | Ring | 60/444 X |
| 4,627,239 | 12/1986 | Nighimone | 60/484 |

*Primary Examiner*—Harold W. Weakley
*Attorney, Agent, or Firm*—James A. Wanner; Harold A. Williamson; William D. Lanyi

[57] ABSTRACT

A dual pressure source, or selectively alternative high pressure source, control system for a variable displacement hydraulic unit servo mechanism wherein normal control of the unit is provided by the low pressure source, such as a transmission charge pump, and wherein a high pressure source of control fluid with a restrictive orifice is provided to initiate servo movement, especially under conditions generating high internal friction. The flow restrictive orifice generates a pressure drop in a high pressure control line once the servo mechanism starts to move, inducing flow through such line. Thus, the control system provides a momentary source of high pressure fluid but permits control rate changes which are substantially independent of the hydraulic unit working pressure. Preferably, the high pressure source is a shuttle selected highest pressure of a transmission main loop incorporating the hydraulic unit.

21 Claims, 3 Drawing Figures

DUAL PRESSURE DISPLACEMENT CONTROL SYSTEM

FIELD OF THE INVENTION

This invention is directed to a dual source of pressure used in a hydraulic servo control system to modify the displacement of a variable displacement hydraulic unit wherein the pressure for the control system comes from a low pressure source providing normal control of the unit displacement, and an alternate source, preferably one of fluid lines leading from the hydraulic unit, which provides a high pressure source of control fluid. The dual pressure source control system is particularly advantageous for use with a variable displacement bent axis motor encountering stall conditions.

BACKGROUND OF THE INVENTION

It is common in variable displacement hydraulic units to have a hydraulic servo control mechanism for varying unit displacement. A low pressure source of control fluid, such as a charge pump in a transmission, provides control fluid to the servo mechanism through a displacement control valve. For many variable displacement hydraulic units, this low pressure source, generally in the neighborhood of 200 to 300 psi, provides sufficient fluid pressure to operate the hydraulic servos with proper response speeds under normal operating conditions.

However, some variable displacement hydraulic units, such as modern design bent axis variable displacement motors which change displacement by sliding a valve plate segment in the endcap, have high internal friction especially in a stall condition when there is no shaft rotation. Such units, when stalled require relatively high servo forces to move the valve plate segment. This necessitates either large servo pistons, which are more expensive and increase unit volume, or a source of high pressure. Therefore, some hydraulic units are provided with relatively small servos which are designed to utilize unit main loop working pressure as the control fluid source. When high pressure sources are utilized to provide control fluid, unacceptable response speed changes occur relative to variable system working pressures. This is especially true in the case of dual path systems where both transmission motors must react together in a coordinated, controlled manner. Furthermore, a high pressure source for control fluid may require additional or modified pumps and will increase power loss during normal operation.

Motor pressure compensating systems have been used wherein main loop working pressures are applied to the motor servos only upon an overpressure condition. These systems do not have any low pressure control fluid source and the displacement is not varied other than in overpressure conditions. Pump pressure limiter systems generally have a displacement control utilizing a low pressure source, such as charge pressure, and sense high working pressure to provide an additional control signal upon an overpressure condition, but such additional control signal is limited by valves to also be of a low pressure nature. Units such as taught in U.S. Pat. No. 4,480,963, Ring issued Nov. 6, 1984, use the highest of main loop pressures and charge pressure. Therefore, the pump servos are always subjected to the highest pressure available and thus cannot have a response rate substantially independent of working pressure. The latter is also true of units such as taught in U.S. Pat. No. 4,194,364, Pahl et al. issued Mar. 25, 1980.

SUMMARY OF THE INVENTION

The primary feature of the present invention is to provide a dual control pressure source, or a selectively alternative high pressure source of control fluid, for use in a hydraulic unit displacement control servo mechanism wherein the low pressure source is utilized under normal control conditions and the high pressure source is utilized only momentarily under certain temporary conditions. This permits the use of a relatively small volume servo mechanism, reducing overall unit size, with a low pressure source of control fluid, and which is momentarily subjected to a high pressure source when a particular control function is desired.

Another object of the present invention is to provide a dual source, or a selectively alternative high pressure source of control fluid as described above, wherein the high pressure source is the working pressure of the hydraulic unit which is connected to the control system by means of a flow restriction orifice so that the control servos are only subjected to the unit high working pressures to initiate servo response while permitting the servo system to have a response rate which is substantially independent of working pressures.

It is a further object of the present invention to utilize a dual pressure control system with a variable displacement motor having relatively high internal friction and a relatively small servo mechanism which is normally suojected to low control pressures with high control pressures momentarily available to initiate servo response under stalled conditions.

It is yet another object of the present invention to utilize a dual pressure control system with a dual path system having two substantially identical hydraulic units with the momentary high pressure source of control fluid being the highest pressure encountered by either unit.

It is yet a further object of the present invention to utilize a dual pressure servo control system for a variable displacement hydraulic unit having displacement setting means positioned by a hydraulic servo mechanism. The hydraulic unit is provided with main loop lines, at least one of which is capable of being subjected to high loop pressure during operation of the hydraulic unit. A control line including a displacement control valve provides a controlled flow of fluid under pressure to the servo mechanism. One source of fluid under pressure for the control line comprises a low pressure source connected to the control line through a check valve and the high pressure source comprises a high pressure control line connected to the control line downstream of the check valve. The high pressure line includes a flow restriction which limits the flow to the control line and generates a significant pressure drop in the high pressure control line once movement is initiated in the servo mechanism.

Still another object of the present invention is to utilize a selectively alternative high pressure control source for a variable displacement hydraulic unit servo mechanism positioning displacement setting means for the unit which is positioned within a hydraulic main loop having at least one main loop line, which during operation of the hydraulic unit is subjected to hydraulic pressure higher than said low pressure source, and is related to hydraulic load. A low pressure source of control fluid is connected to the servo mechanism by a control line including a displacement control valve. The improvement comprises a check valve in the control line between said low pressure source and said displacement control valve and a high pressure source of control fluid consisting of a fluid line connecting the high pressure main loop line to the control line downstream of the check valve and upstream of said displacement control valve. The fluid line includes a normally closed valve which is responsive to main loop pressure which opens when the pressure in the main loop line rises above a predetermined pressure. The main loop line provides high pressure to initiate movement of the said servo mechanism when the normally closed valve opens in response to a rise in main loop pressure. Additionally a flow restriction can limit the flow from the main loop to the servo mechanism when the normally closed valve is open. The flow restriction provides a significant drop in pressure in the fluid line once the servo mechanism movement is initiated.

BRIEF DESCRIPTION OF THE PREFERRED EMBODIMENTS

Figure 1:
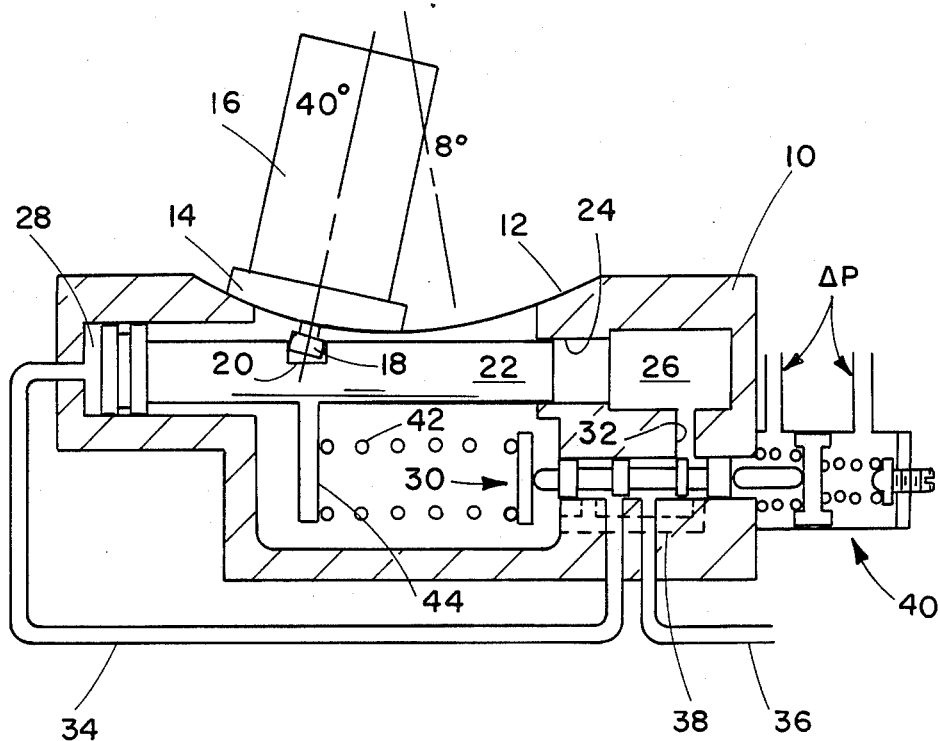
FIG. 1 is a fragmentary view of a portion of a bent axis hydraulic motor with a displacement control valve and a relatively small volume servo mechanism.

The present invention is directed to providing alternative sources of control fluid for displacement control servo mechanism for hydraulic units. FIG. 1 teaches a servo control mechanism for one form of a variable displacement hydraulic unit, and more particularly a bent axis hydraulic motor having a relatively small volume servo mechanism. A motor housing endcap 10 is shown having a curved surface upon which slides a valve plate segment 14 which changes the angle between the hydraulic unit rotating block 16 and an output shaft (not shown). Since the valve plate segment 14 is subjected to the hydraulic unit working pressures, the sliding friction between the segment 14 and the curved surface 12 increase dramatically as hydraulic unit working pressures increase. Thus, relatively high servo forces are needed in order to properly position the valve plate segment 14 and the rotating block 16 between the 40° maximum displacement position and 8° minimum displacement position for the unit as shown. The valve plate segment 14 has a projection 18 which engages a notch 20 of a displacement setting servo piston 22 sliding in bore 24. The projection 18 is representative of many means interconnecting any servo mechanism and a hydraulic unit displacement setting means.

The servo piston 22 is subjected to fluid pressures in chambers 26 and 28 which are representative of servo cylinders. A displacement control valve 30 preferably of the proportional type is connected to the two chambers by fluid lines 32 and 34 and is further connected to a control fluid line 36 and to case or drain by drain line 38. The control fluid line 36 is connected to sources of control fluid which are the object of the present invention and are described in detail below. The displacement control valve 30 is positioned by displacement position input means 40, which in the present instance is shown as a spring centered piston arrangement subjected to an input signal $\Delta P$. The proportional displacement servo control, in the present instance, further includes a feedback spring 42 interposed between the displacement control valve 30 and a wing or projection 44 extending from the servo piston 22.

The servo mechanism and displacement control valve means described above are representative of one known form of hydraulic unit variable displacement servo control. While the input shown is a pressure differential input signal, the input signal to the displacement control valve 30 may also be manual, mechanical, or electrical. The above description is merely to disclose one type of hydraulic unit which can utilize the dual pressure control system of the present invention.

Figure 2A:
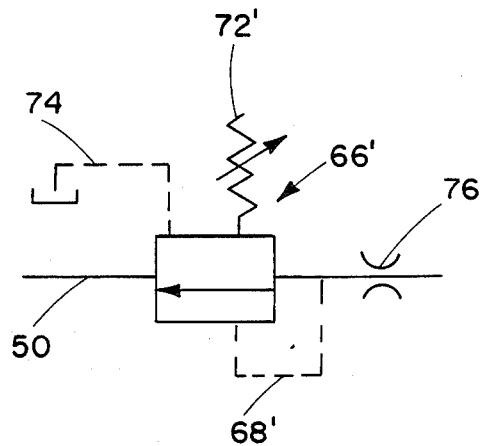
FIG. 2A is a schematic view of an alternative valve which may be used in the control circuit of FIG. 2.
Figure 2:
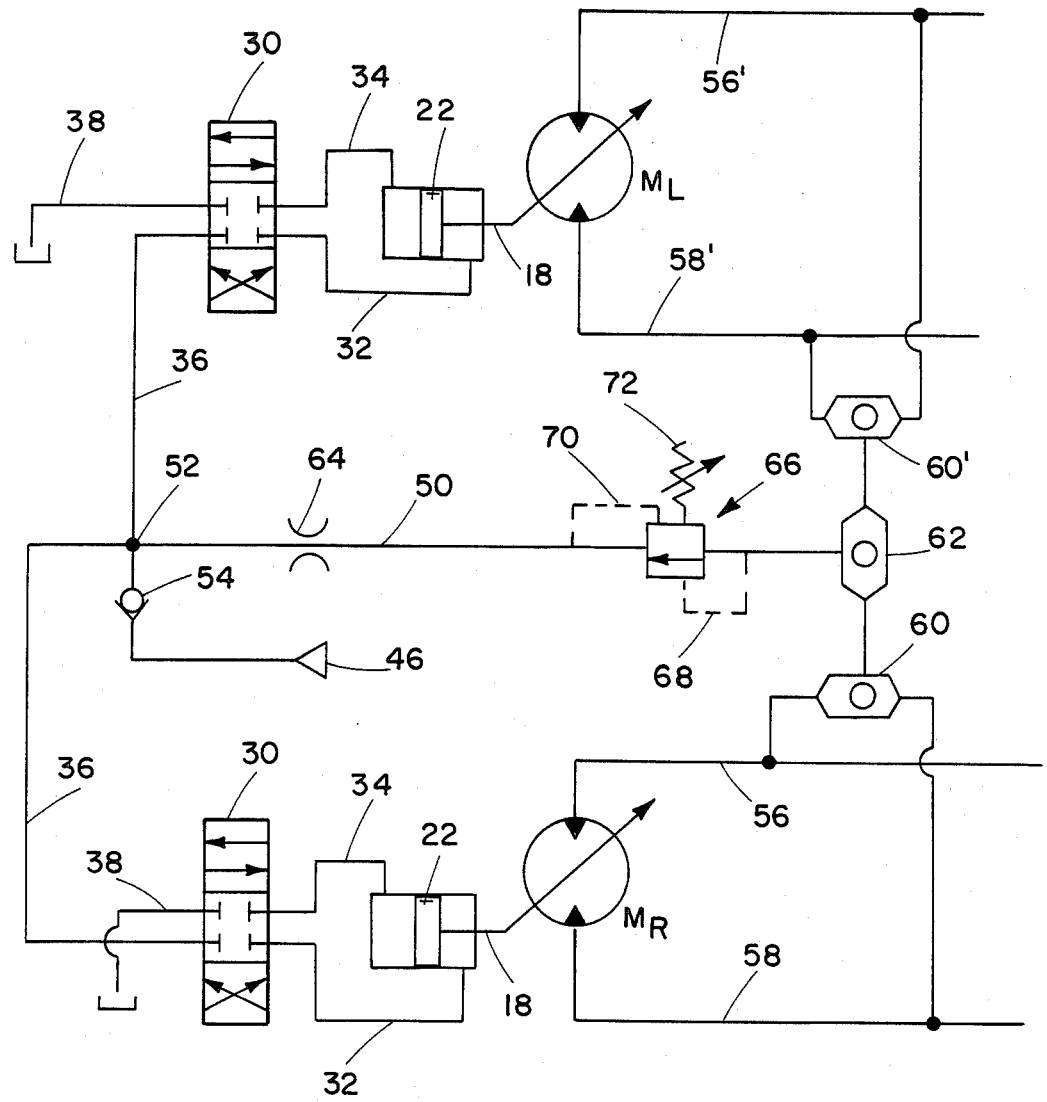
FIG. 2 is a schematic view of the hydraulic circuit providing the dual pressure control fluid sources of the present invention.

FIG. 2 shows a pair of variable displacement hydraulic units $M_R$ and $M_L$ each having the servo mechanism and displacement control valve such as just described. The hydraulic units represent a pair of variable displacement motors utilized in a dual path transmission system. The displacement control servo mechanisms are connected by the control fluid line 36 to a relatively low pressure source 46 of control fluid such as a charge pump. Such servo control is well known whether utilized with a single hydraulic pump or motor, or a pair thereof in dual path systems, with the charge pump providing control pressures in the range of 200-300 psi.

The above described servo control provides uniform relatively predictable servo mechanism response rates since the low pressure source 46 is a constant pressure. However, with small volume servo mechanisms, this control system does not always provide adequate control forces. This is especially true with a bent axis motor unit as shown which has very high internal friction when the motor is stalled. This generates high starting friction, sometimes referred to as stiction in the displacement control and, which must be overcome by the servo mechanism to initiate movement of the valve plate segment 14. The low pressure source 46 is quite often insufficient to provide such servo forces to overcome the stiction, particularly when the aforesaid smaller volume servo mechanism is used.

In the present invention, and as shown in FIG. 2, a high pressure fluid control line 50 is connected with control line 36, or lines 36 in a dual path system, at a junction 52 downstream of low pressure source 46 and upstream of the displacement control valve 30. A check valve 54 is interposed between junction 52 and the low pressure source 46 to prevent source 46 from being subjected to high pressures. The high pressure control line 50 is connected to the working pressure of the transmissions as would occur in main loop lines 56 or 58 of the right transmission including the motor $M_R$, and loop lines 56' or 58' connected to the left transmission motor $M_L$. The main loop lines may be connected in open circuit or closed circuit to a transmission pump (not shown). When the transmission is reversible, the higher pressure side of the main loop alternates between lines 56 and 58, or lines 56' and 58', dependent upon direction of operation of the transmission. The higher pressure of each transmission main loop is selected by shuttle valve 60 or 60' and the higher of the two transmission pressures is selected by main shuttle 62 which is in turn connected to high pressure control line 50. Of course, if only one variable displacement unit is utilized, shuttles 60' and 62 would not be utilized with the high pressure control line 50 connected directly to shuttle 60.

The highest main loop pressure, as selected by the shuttle valves, is directed through line 50 to junction 52 and must first pass a flow restricting orifice 64 which is of extremely small diameter, such as 0.020"–0.050". The orifice 64 prevents any substantial bleeding of fluid from the main loop lines, and more importantly generates a pressure drop between line 50 and line 36 once the flow between the high pressure control line 50 and the servo mechanisms has been initiated. When the displacement control valves 30 are in their neutral position, there is no flow to the servo mechanisms from either the high pressure line 50 or the low pressure force 46. Movement of the displacement control valves 30 to either their forward or reverse positions permits flow to the servo cylinders. Since line 50 is normally at higher pressure than the low pressure source 46, check valve 54 is closed, and there is high pressure flow from line 50 to the servo cylinders to initiate movement of the servo pistons 22. This initial surge of high pressure fluid overcomes any stiction that might occur in the hydraulic units. Movement of the servo pistons 22 requires flow which generates a pressure drop at orifice 64, which in turn substantially reduces the line 50 pressure at junction 52 until it drops below the pressure of source 46. At this time, check valve 54 opens and further control movement is generated by the regulated 300 psi low pressure source 46. Since the high pressure source of control fluid, which could also be a high pressure pump or other source different than the working pressure of the hydraulic units, is only used to initiate servo piston movement, normal control with the predictable response rates is provided from the low pressure source. Even when the high pressure source is the working fluid of the hydraulic unit, the flow from line 50 occurs only momentarily and thus the control response rates are substantially independent of the variable working fluid pressures. It is thus seen that the high pressure control fluid is only provided to the servo mechanism to initiate movement to overcome stiction or when the servo pistons move at extremely low speeds. This is because of the extreme flow restriction generated by orifice 64.

As can be seen in FIG. 2, the high pressure control line 50 may also be provided with an inline relief valve 66 having upstream and downstream pilots 68 and 70 and set to open at a predetermined pressure by adjustable spring 72. Such inline relief valve 66 has an inherent characteristic of providing a pressure drop across tne valve. Normally, the maximum pressure of the transmission main loops are determined oy main loop relief valves normally set at an extremely high pressure such as 6000 psi. By setting adjustable spring 72 so as to open the valve 66 at 4500 psi, junction 52 only sees the high pressure when one of the transmission main loops is subjected to pressures above 4500 psi and the valve generates an equal pressure drop. Since source 46 is set at 300 psi, in the example given, control flow occurs in line 50 only when the inline relief valve 66 senses pressures above 4800 psi which indicate a stall or near-stall condition of one of the motors, $M_R$ or $M_L$. Thus, in this preferred example the hydraulic servo mechanisms are not subjected to any high pressure control source, even to initiate movement of the servo pistons 22, until relatively high working pressures are encountered by the hydraulic units, which is when stiction is highest. High pressure flow to the servo mechanisms is limited to only when the hydraulic unit working pressures are high, thus further making servo response speeds independent of working pressure. However, at the maximum stall pressure 6000 psi permitted by the main loop relief valves, the servo mechanisms can be momentarily subjected to as much as 1500 psi control pressures, until there is a flow induced pressure drop at orifice 64, to overcome the stiction in the servo mechanism of the hydraulic units. In practice, the flow restriction 64 can be built into, or made an integral part of, the relief valve 66.

Alternatively, a pressure responsive sequence valve 66' as shown in FIG. 2A, can be substituted for the inline relief valve 66 in high pressure control line 50. The sequence valve 66' has a high pressure pilot 68' and an adjustable spring 72' similar to the inline pressure relief valve 66 of FIG. 2. However, the downstream pilot 74 communicates with drain rather than the downstream portion of line 50. Thus, the sequence valve 66' does not have the inherent pressure reducing function that occurs with the inline relief valve 66. Therefore, a second flow restricting orifice 76 may also be positioned in the high pressure control line 50 upstream of the sequence valve 66'. Dependent upon the size of the second orifice 76, the high pressure control fluid flow at junction 52 may be somewhat higher or lower for the embodiment shown in FIG. 2A when compared with the embodiment shown in FIG. 2. However, for all practical purposes, the two embodiments work substantially the same with tne flow induced pressure drop in high pressure control line 50 being generated by either one orifice 64 or by a pair of orifices 64 and 76. Again the flow restrictions 64 and 76 can be built into, or made an integral part of, the sequence valve 66'.

When either of the valve 66 or 66' is utilized, the servo mechanisms only see high pressure fluid once the transmission main loops are subjected to a predetermined pressure, and in all cases only see the high pressure fluid momentarily due to the pressure drop at the flow restricting orifice 64, even if there is no valve 66 or 66'. Therefore, response rates substantially independent to working fluid pressure are obtained. Preferably the pressure in line 50 available to overcome stiction, that is before the flow induced pressure drop, is at least twice the pressure of the low pressure source, at least at maximum pressure or stall conditions. When inline valve 66 is used, this is controlled by adjusting spring 72 which adjusts the inherent pressure drop of the valve. When no valve is used the ratio may be as high as 20:1, tnat is 6000 psi (maximum main loop pressure) divided by 300 psi (charge pump pressure). The same is true when a sequence valve is used.

When the present invention is utilized with a pair of displacement control servo mechanisms, such as in the dual path system shown in FIG. 2, the high pressure flow to both servo mechanisms is only momentary resulting in that both servo mechanisms operate substantially independent of working pressures. Therefore, both servo mechanisms, for all normal control, are subjected to the same low pressure source 46 to operate in a predictable response curve. However, utilizing the three shuttle system, the highest working pressure available is utilized to overcome servo stiction when necessary in either transmission with both servos being equally subjected to the high pressure to operate in a coordinated manner. Previous dual path systems having low volume servo means had each motor servo means subjected to the higher working pressure in the main loop of each motor resulting in two different response rates, which were further dependent upon working pressures, resulting in inconsistent speed changes for the transmissions.

From the above description of the preferred embodiment it can be seen that a dual pressure, or a selectively alternative high pressure, control system is obtained wherein low pressure control fluid is supplied for all normal displacement control of hydraulic units and wherein selectively a high pressure source of control fluid through a restrictive orifice is obtained to initiate servo movement under preselected conditions, thus meeting the objectives of the present invention. The specifically described embodiments are merely illustrative of the preferred forms of practicing the present invention, but are not intended to limit the scope thereof.

We claim:

1. A dual pressure servo control system for a variable displacement hydraulic unit having displacement setting means positioned by a hydraulic servo mechanism, said hydraulic unit being provided with main loop lines at least one of which is capable of being subjected to high main loop pressure during operation of said hydraulic unit, a control line including a displacement control valve providing a controlled flow of fluid under pressure to said servo mechanism, and a source of fluid under pressure for said control line comprising a low pressure source connected to said control line through a check valve and high pressure source comprising of a high pressure control line connected to said control line downstream of said check valve, said high pressure control line including a flow restriction limiting flow to said control line means and generating a significant flow induced pressure drop in said high pressure control line once movement in said servo mechanism is initiated.

2. The dual pressure servo control of claim 1 wherein said high pressure control line interconnects said main loop line at high main loop pressure with said control line.

3. The dual pressure servo control of claim 2 wherein said high pressure control line includes a normally closed main loop pressure responsive valve set to open when said main loop pressure exceeds a predetermined pressure.

4. The dual pressure servo control of claim 3 wherein said flow restriction is an orifice downstream of said pressure responsive valve in said high pressure control line and is less than 0.050" diameter.

5. The dual pressure servo control of claim 3 wherein said pressure responsive valve is an inline pressure relief valve which generates a pressure drop in the high pressure control line.

6. The dual pressure servo control of claim 3 wherein said pressure responsive valve is a sequence valve and said high pressure control line includes a further flow restriction upstream of said sequence valve.

7. The dual pressure servo control of claim 2 wherein said main loop lines include a shuttle valve selecting the highest pressure in said main loop and said high pressure control line is connected to said shuttle valve.

8. The dual pressure servo control of claim 7 for use in a dual path transmission system having a pair of said variable displacement units with said servo mechanisms and displacement control valves of each unit being connected to a single high pressure control line which is in turn connected to a third shuttle valve selecting the highest pressure of the main loop shuttle valves of each variable displacement unit.

9. The dual pressure servo control of claim 1 wherein the pressure in said high pressure line prior to the flow induced pressure drop is at least twice the pressure of said low pressure source.

10. The dual pressure servo control of claim 1 wherein said displacement control valve operates in a proportional manner.

11. The dual pressure servo control of claim 1 wherein said variable displacement unit is a bent axis motor.

12. A selectively alternative source of control pressure for a variable displacement hydraulic unit including a hydraulic servo mechanism positioning displacement setting means for said unit, a low pressure source of control fluid connected to said servo mechanism by a control line including a displacement control valve, said hydraulic unit being positioned within a hydraulic main loop having at least one main loop line which during operation of said hydraulic unit is subjected to hydraulic pressure higher than said low pressure source and related to hydraulic load on said hydraulic unit, the improvement comprising: a check valve in said control line between said low pressure source and said displacement control valve, a high pressure source of control fluid consisting of a fluid line connecting said one main loop line to said control line downstream of said check valve and upstream of said displacement control valve, said fluid line including a normally closed valve which is responsive to main loop pressure to open when the pressure in said main loop rises above a predetermined pressure, said one main loop line providing high pressure to initiate movement of said servo mechanism when said normally closed valve opens in response to a rise in main loop pressure.

13. The selectively alternative source of control pressure of claim 12 wherein said fluid line includes a flow restriction which limits the flow from said main loop to said servo mechanism when said normally closed valve is open, said flow restriction providing a significant drop in pressure in said fluid line once servo mechanism movement is initiated.

14. The selectively alternative source of control pressure of claim 13 wherein said flow restriction is an orifice downstream of said pressure responsive valve in said fluid line and is less than 0.050" diameter.

15. The selectively alternative source of control pressure of claim 12 wherein said pressure responsive valve is an inline pressure relief valve which generates a pressure drop in the high pressure control line.

16. The selectively alternative source of control pressure of claim 12 wherein said pressure responsive valve is a sequence valve and said fluid line includes a further flow restriction upstream of said sequence valve.

17. The selectively alternative source of control pressure of claim 12 wherein said main loop lines include a shuttle valve selecting the highest pressure in said main loop and said fluid line is connected to said shuttle valve.

18. The selectively alternative source of control pressure of claim 17 for use in a dual path transmission system having a pair of said variable displacement units with said servo mechanisms and displacement control valves of each unit being connected to a single fluid line which is in turn connected to a third shuttle valve selecting the highest pressure of the main loop shuttle valves of each variable displacement unit.

19. The selectively alternative source of control pressure of claim 12 wherein said displacement control valve operates in a proportional manner and said variable displacement unit is a bent axis motor.

20. A selectively alternative source of control pressure for a variable displacement hydraulic bent axis motor including a hydraulic servo mechanism positioning displacement setting means for said motor, a low pressure source of control fluid connected to said servo mechanism by a control line including a displacement control valve, said motor being positioned within a hydraulic closed circuit main loop having a pair of main loop lines which during reversible operation of said motor are alternatively subjected to hydraulic pressure higher than said low pressure source and related to hydraulic load on said motor, the improvement comprising: a check valve in said control line between said low pressure source and said displacement control valve, a high pressure source of control fluid consisting of a shuttle valve selecting the highest pressure of said pair of main loop lines and a fluid line connecting said shuttle valve to said control line downstream of said check valve and upstream of said displacement control valve, said fluid line including a normally closed valve which is responsive to main loop pressure to open when the pressure in said main loop rises above a predetermined pressure and a flow restriction which limits the flow from said main loop to said servo mechanism when said normally closed valve is open, said shuttle valve and said normally closed valve providing high pressure to initiate movement of said servo mechanism when said normally closed valve opens in response to a rise in main loop pressure and said flow restriction providing a significant drop in pressure in said fluid line once servo mechanism movement is initiated.

21. The selectively alternative source of control pressure of claim 20 for use in a dual path transmission system having a pair of said motors with said servo mechanisms and displacement control valves of each motor being connected to a single fluid line which is in turn connected to a third shuttle valve selecting the highest pressure of the main loop shuttle valves of each motor.

* * * * *